United States Patent [19]
Itoh et al.

[11] Patent Number: 6,035,653
[45] Date of Patent: Mar. 14, 2000

[54] AIR CONDITIONER

[75] Inventors: Satoshi Itoh, Kariya; Kunio Iritani, Anjo, both of Japan

[73] Assignee: Denso Corporation, Kariya, Japan

[21] Appl. No.: 09/052,788

[22] Filed: Mar. 31, 1998

[30] Foreign Application Priority Data

Apr. 17, 1997 [JP] Japan ..................................... 9-100499

[51] Int. Cl.⁷ ..................................................... F25B 1/00
[52] U.S. Cl. .......................... 62/228.4; 62/176.5; 62/205; 62/224
[58] Field of Search .................................... 12/228.4, 173, 12/176.5, 204, 205, 222, 223, 224, 225

[56] References Cited

U.S. PATENT DOCUMENTS

| | | |
|---|---|---|
| 5,316,074 | 5/1994 | Isaji et al. |
| 5,345,776 | 9/1994 | Komazaki et al. ...................... 62/176.3 |
| 5,427,175 | 6/1995 | Nagasawa ................................... 165/25 |
| 5,526,650 | 6/1996 | Iritani et al. ............................... 62/205 |
| 5,701,753 | 12/1997 | Iritani ........................................ 62/211 |
| 5,709,098 | 1/1998 | Itoh et al. ............................... 62/228.4 |

FOREIGN PATENT DOCUMENTS

| | | |
|---|---|---|
| 8-40056 | 2/1996 | Japan . |
| 8-216662 | 8/1996 | Japan . |

*Primary Examiner*—Henry Bennett
*Assistant Examiner*—Marc Norman
*Attorney, Agent, or Firm*—Harness, Dickey & Pierce, PLC

[57] ABSTRACT

An air conditioner capable of enhancing responsivity of a blowout temperature of conditioned air while preventing occurrence of an overshoot or undershoot condition of the blowout temperature when a user gives an instruction to change the blowout temperature in a dehumidifying operation mode. In a control state, if a set temperature level is adjusted to increase a blowout temperature of conditioned air by increasing the target condenser outlet temperature, the rotating speed of the refrigerant compressor is increased, while the restriction opening of the heating expansion valve is maintained. Thus, the condenser outlet temperature is regulated to the target temperature with minimal undershoot or overshoot of the target temperature.

12 Claims, 6 Drawing Sheets

AIR CONDITIONER

CROSS-REFERENCE TO RELATED APPLICATION

This application is related to Japanese Patent Application No. Hei 9-100499 filed on Apr. 17, 1997, the contents of which are hereby incorporated by reference.

BACKGROUND OF THE INVENTION

1. Field of the Invention

The present invention relates to an air conditioner having two internal refrigerating-cycle heat exchangers in an air-conditioning housing for air dehumidification, and more particularly to an improved air conditioner which is capable of enhancing controllability of blowout air temperature in a dehumidifying operation mode.

2. Description of Related Art

A conventional automotive air conditioner having a dehumidifying-mode setting is disclosed in Japanese Unexamined Publication No. 40056/1996. The conventional air conditioner is arranged to make it possible to set up a dehumidifying operation mode by means of a refrigerating cycle system comprising an internal condenser and an internal evaporator in an air-conditioning housing, and an external heat exchanger outside the air-conditioning housing.

In the dehumidifying mode, a refrigerant flows through the internal condenser, the external heat exchanger and then the internal evaporator. In the internal evaporator, air is cooled and dehumidified. The cooled and dehumidified air is then heated in the internal condenser.

In this sequence of dehumidification, in which the air is cooled and dehumidified sufficiently in the internal evaporator, heating performance of the internal condenser is controlled to regulate a temperature of air passing through the internal condenser (condenser outlet temperature) corresponding to a blowout temperature of conditioned air.

More specifically, in the above-mentioned conventional arrangement, a temperature of air immediately after passing through the internal evaporator (evaporator outlet temperature) is made lower than a suction temperature of air before passing through the internal evaporator by a degree of at least a predetermined value. The above is accomplished by controlling compressor rotational speed to provide a required level of air cooling and dehumidification.

The condenser outlet temperature is regulated by controlling a restriction opening of variable flow restriction means (electric expansion valve), equipped between the external heat exchanger and the internal condenser, to provide a required blowout temperature TAO as calculated according to various air-conditioning environmental factors (e.g., inside air temperature, outside air temperature, etc.).

However, it has been found that the conventional arrangement mentioned above has several disadvantages. In the conventional air conditioner mentioned above, when a user adjusts a blowout temperature setting lever for regulating the condenser outlet temperature, the blowout temperature TAO is recalculated accordingly. The restriction opening of the variable flow restriction means is then varied in small increments so that the condenser outlet temperature reaches a target value corresponding to the required blowout temperature TAO. Since the restriction opening is varied in small increments as stated above, the conventional air conditioner is disadvantageous in that a response characteristic of the condenser outlet temperature is typically slow, and thus unsatisfactory.

It may be possible to regulate the condenser outlet temperature quickly by varying the restriction opening in larger increments. However, if the restriction opening is varied in such a manner, refrigerant flow rate varies significantly, causing an overshoot or undershoot condition of the condenser outlet temperature with respect to the target blowout temperature TAO.

SUMMARY OF THE INVENTION

In view of the foregoing, it is an object of the present invention to provide a motor vehicle air conditioning system that allows condenser outlet temperature to be regulated during a dehumidifying mode in accordance with a desirable response characteristic and with minimal undershoot and overshoot of a target temperature.

The above object is achieved by the present invention by providing a motor vehicle air conditioner system including an air conditioner, and a control panel that permits a user to select an air conditioner operating mode, including a dehumidifying mode. The system includes air conditioner sensors that sense air conditioner operating conditions and that generate signals indicative of the sensed operating conditions. A controller receives the signals from the sensors, and adjusts operating parameters of the system compressor and the valve to adjust the blowout temperature during a dehumidification mode in which blowout air dehumidification is a dominant factor. The controller also adjusts the operating parameters of the compressor, and maintains the operating parameters of the valve, during a dehumidification mode having blowout temperature, rather than dehumidification, as a dominant factor, to minimize sensed blow out temperature overshoot and undershoot, and to minimize time needed to reach the target blowout temperature.

Other objects and features of the present invention will appear in the course of the description that follows.

DETAILED DESCRIPTION OF THE PREFERRED EMBODIMENTS

This invention will now be described in detail by way of example, with reference to the accompanying drawings.

Figure 1:
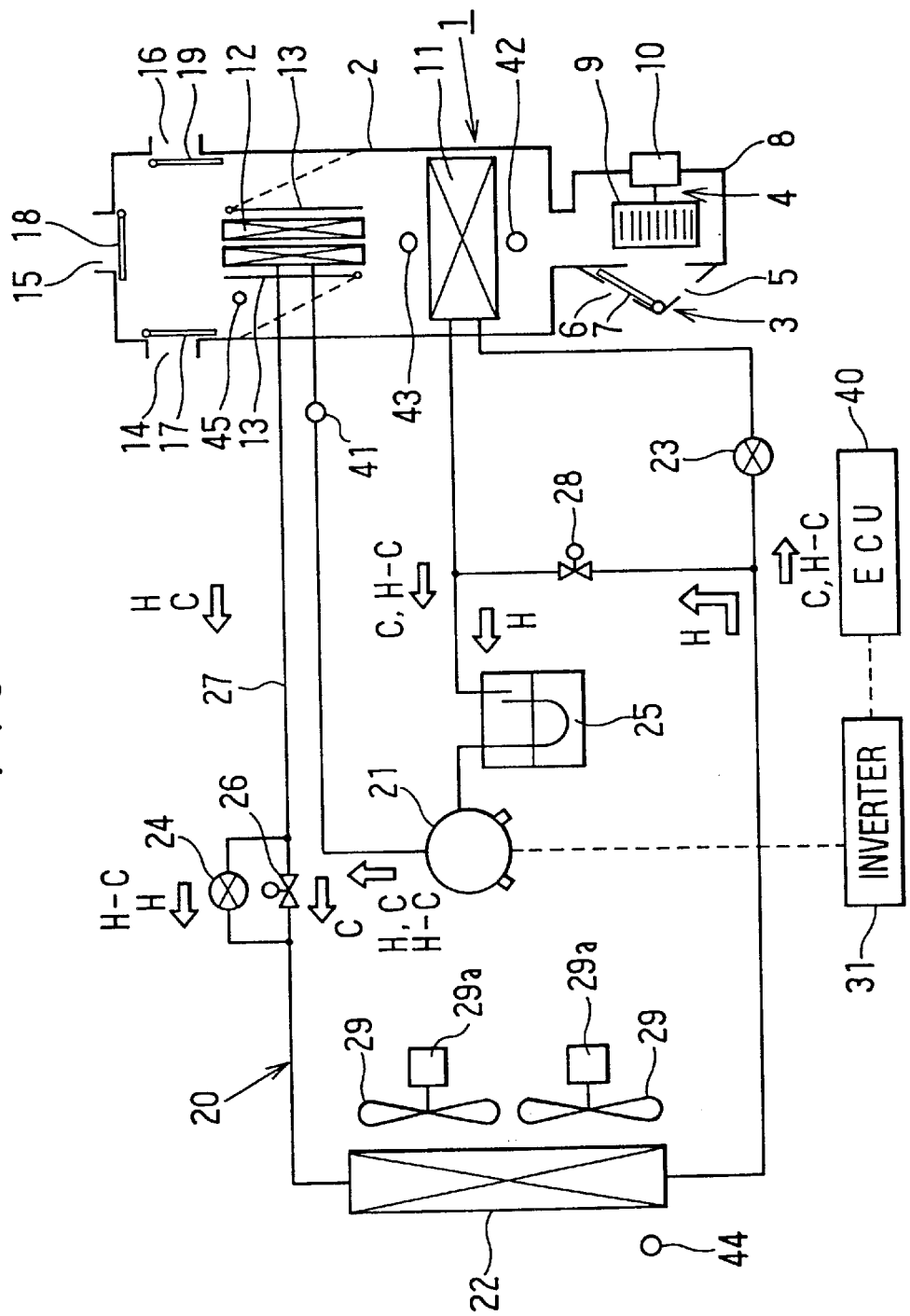
FIG. 1 is an entire configuration diagram of an air conditioner for automobiles in a preferred embodiment of the present invention.

The present preferred embodiment of the invention finds application in an automobile air conditioner. Referring to FIG. 1, an air-conditioning housing 2 in an air-conditioning unit 1 constitutes an air duct for introducing air into an automobile compartment. At one end of the air-conditioning housing 2, inside/outside air selecting means 3 and air blowing means 4 are provided. At the other end thereof, a plurality of blow outlets 14 to 16 to the passenger compartment are provided.

The inside/outside air selecting means 3 comprises an inside/outside air selecting chamber having an inside air inlet 5 for taking in air inside the passenger compartment (inside air), an outside air inlet 6 for taking in air outside the passenger compartment (outside air), and an inside/outside air selecting door 7 equipped for selectively opening/closing either of the air inlets 5 and 6. The inside/outside air selecting door 7 is driven by an inside/outside air selector lever 54 to be described later (shown in FIG. 3) through a manual control mechanism (not illustrated).

The air blowing means 4 produces an air current in the air-conditioning housing 2, which is arranged as an air duct. Thus, air is fed from the inside air inlet 5 or outside air inlet 6 toward each of the blowout outlets 14 to 16. To be more specific, a centrifugal multiblade fan 9 is provided in a scroll casing 8, and the fan 9 is driven by a motor 10.

A cooling evaporator 11 (cooling heat exchanger) is located at the air downstream side of the fan 9 in the air-conditioning housing 2. The cooling evaporator 11 is a heat exchanger that is part of a refrigerating cycle system 20 to be described later. The cooling evaporator 11 serves as an evaporator for dehumidifying and cooling air in the air-conditioning housing 2 by evaporating a refrigerant flowing therethrough in a cooling operation mode. In a heating operation mode, the refrigerant does not flow through the cooling evaporator 11.

A heating condenser 12 is equipped on the air downstream side of the cooling evaporator 11 in the air-conditioning housing 2. The heating condenser 12 is a heat exchanger in the refrigerating cycle system 20, and it serves as a condenser for heating air in the air-conditioning housing 2 by condensing the refrigerant flowing therethrough in a heating operation mode. In a cooling operation mode, although the refrigerant also flows through the heating condenser 12, the re-heating of air is circumvented by an air mixing door 13.

The air mixing door 13 is positioned adjacent the heating condenser 12 in the air-conditioning housing 2, and is controlled by an electronic control unit (ECU) 40. The ECU 40 is programmed to set the position of the air mixing door 13 to regulate a flow rate of force fed air from the fan 9 to the heating condenser 12, and of force fed air that bypasses the heating condenser 12. In a cooling operation mode, the ECU sets the air mixing door 13 to a position such that all force fed air from the fan 9 bypasses the heating condenser 12. In a heating operation mode, the ECU sets the air mixing door 13 to a position such that all the force fed air from the fan 9 passes through the heating condenser 12.

Still referring to FIG. 1, the blow outlets 14 to 16 are now described in more detail. The blow outlet 14 is a defrosting blow outlet for delivering conditioned air toward the internal surface of a windshield of the automobile. The blow outlet 15 is a face blow outlet for delivering conditioned air toward the upper part of each occupant in the passenger compartment. The blow outlet 16 is a foot blow outlet for delivering conditioned air toward the feet of each occupant in the passenger compartment. At blow outlet upstream air positions, doors 17 to 19 are provided for opening/closing the blow outlets.

The refrigerating cycle system 20 is of a heat pump type; the cooling evaporator 11 and the heating condenser 12 are therefore used for cooling, heating and dehumidifying air in the passenger compartment. In addition to the heat exchangers 11 and 12, the refrigerating cycle system also includes the following components: a refrigerant compressor 21; an external heat exchanger 22 located outside the air-conditioning housing 2; a cooling expansion valve 23; a heating expansion valve 24; an accumulator 25; a cooling solenoid valve 26 for changing over a flow of refrigerant; and a heating solenoid valve 28. These components are connected in circuit as shown in FIG. 1 using a refrigerant pipe 27. In FIG. 1, reference numeral 29 indicates an external air blowing fan and reference numeral 29a indicates an electric motor for driving the external air blowing fan 29. The heating expansion valve 24 is located on a refrigerant flow path between the heating condenser 12 and the external heat exchanger 22.

The refrigerant compressor 21 sucks, compresses and discharges the refrigerant when driven by an electric motor (not illustrated). This electric motor is incorporated in a hermetic casing in combination with the refrigerant compressor 21, and a rotating speed thereof is continuously under control of an inverter 31. Excitation of the inverter 31 is controlled by the ECU 40.

In the present preferred embodiment, each of the cooling expansion valve 23 and heating expansion valve 24 is of an electric type that can regulate a restriction opening in terms of a cross-section area of the refrigerant flow path. The cooling expansion valve 23 and heating expansion valve 24 are also controlled by the ECU 40.

The cooling expansion valve 23 is used to reduce pressure of the refrigerant, and expands in the cooling operation mode so that the refrigerant is properly fed from the external heat exchanger 22 to the cooling evaporator 11. The heating expansion valve 24, located between the heating condenser 12 and the external heat exchanger 22, is used to reduce pressure of the refrigerant with expansion in the heating operation mode so that the refrigerant is properly fed from the heating condenser 12 to the external heat exchanger 22.

Figure 2:
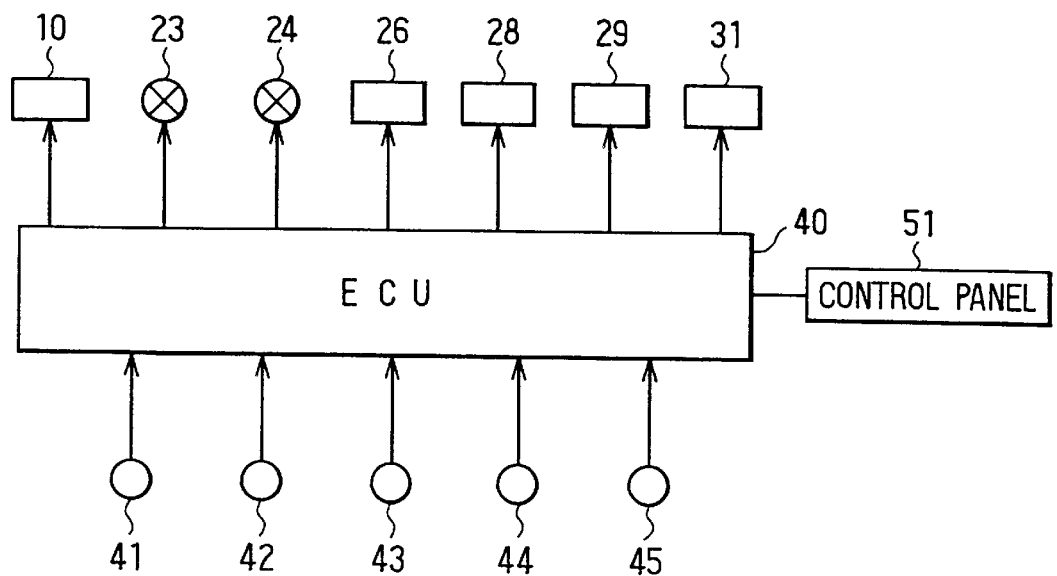
FIG. 2 is a diagram showing a control unit of the air conditioner for automobiles in the preferred embodiment of the present invention.

The following describes the control unit 40 with particular reference to FIGS. 1 and 2. As shown in FIGS. 1 and 2, the control unit 40 receives input signals from a discharge pressure sensor 41 that detects high pressure of the refrigerant discharged from the refrigerant compressor 21. A suction temperature sensor 42 detects the temperature of air taken into the air-conditioning housing 2 by the fan 9 (suction air temperature Tin of the cooling evaporator 11). An evaporator blowout air temperature sensor 43 detects a temperature of air immediately after passing through the cooling evaporator 11 (surface temperature of the cooling evaporator, hereinafter referred to as evaporator outlet temperature). An outside air temperature sensor 44 detects a temperature of outside air. A condenser blowout air temperature sensor 45 detects a temperature of air immediately after passing through the heating condenser 11 (hereinafter referred to as condenser outlet temperature). In addition, the ECU 40 receives input signals from levers and switches of a control panel 51 mounted on the front part in the passenger compartment.

Figure 3:
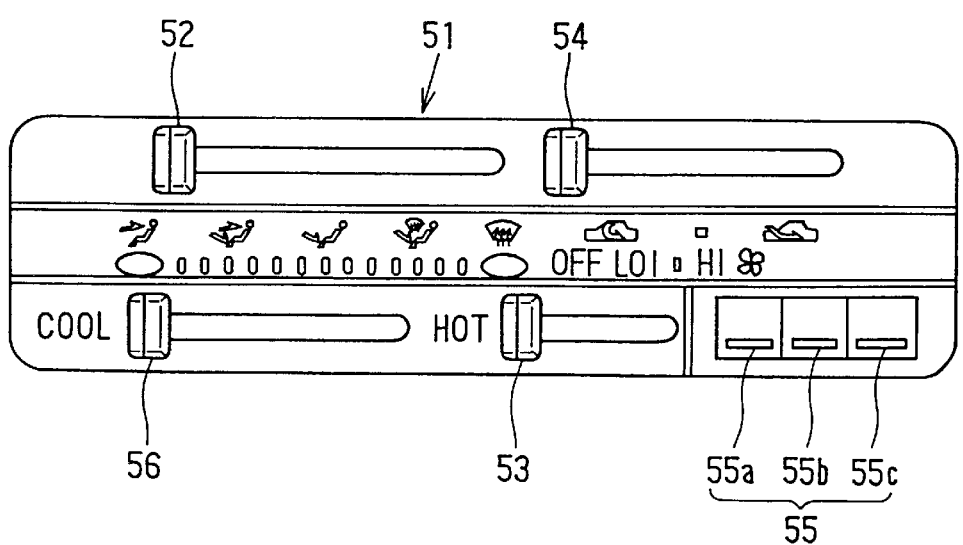
FIG. 3 is a front view of an air-conditioning control panel in the preferred embodiment of the present invention.

Referring to FIG. 3, the control panel 51 is operator controlled and includes the following: a blowout mode setting lever 52 used for setting each blowout mode by the operator; an air volume setting lever 53 for adjusting air volume to be blown into the passenger compartment; an inside/outside air selector lever 54 for setting an inside/outside air select mode; a cooling/heating operation mode setting switch 55 including a cooling switch 55a for setting a cooling operation mode of the refrigerating cycle system 20; a heating switch 55b for setting a heating operation mode; a dehumidifying switch 55c for setting a dehumidifying operation mode, and; a temperature setting lever 56 for adjusting a blowout temperature of conditioned air to be introduced into the passenger compartment.

Referring again to FIG. 2, the ECU 40 incorporates a known microcomputer comprising a CPU, ROM, RAM, and/or other conventional memory and processing components well known to those skill in the art (not illustrated). Input signals from the sensors 41 to 45, and input signals from the control panel 51 are applied to the microcomputer through an input circuit (not illustrated) in the ECU. The microcomputer then carries out predetermined processing to be described later, and respective drive means, including the inverter 31, are controlled by processing. Power to the ECU 40 is supplied from a battery (not illustrated) when a key switch (not illustrated) of the automobile is turned on.

The following describes the refrigerant flow path during operation of the refrigerating cycle system 20.

(1) Cooling Operation Mode

When the cooling switch 55a is turned on by a user, the microcomputer opens the solenoid valve 26 and closes the solenoid valve 28. Thus, the refrigerant flows through the route indicated by arrows C in FIG. 1 as follows: refrigerant compressor 21→external heat exchanger 22→cooling expansion valve 23 (pressure reducing device)→cooling evaporator 11→accumulator 25→refrigerant compressor 21. Therefore, at the cooling evaporator 11, air is cooled for conditioning by evaporation of the refrigerant. In the cooling operation mode, the microcomputer controls the air mixing door 13 so that all the air bypasses the heating condenser 12.

(2) Heating Operation Mode

When the heating switch 55b is turned on by the user, the microcomputer closes the solenoid valve 26 and opens the solenoid valve 28. Thus, the refrigerant flows through the route indicated by arrows H in FIG. 1 as follows: refrigerant compressor 21→heating condenser 12→heating expansion valve 24→external heat exchanger 22→solenoid valve 28→accumulator 25→refrigerant compressor 21. Therefore, at the heating condenser 12, air is heated for conditioning by condensation of the refrigerant. In the heating operation mode, the microcomputer controls the air mixing door 13 so that all the air passes through the heating condenser 12. The heating expansion valve 24 is optimally controlled by an electric motor so that power consumption is minimized.

(3) Dehumidifying Operation Mode

When the dehumidifying switch 55c is turned on by the user, the microcomputer closes both the solenoid valves 26 and 28. Thus, the refrigerant flows through the route indicated by arrows H-C in FIG. 1; refrigerant compressor 21→heating condenser 12→heating expansion valve 24→external heat exchanger 22→cooling expansion valve 23→cooling evaporator 11→accumulator 25→refrigerant compressor 21.

Therefore, the refrigerant discharged from the refrigerant compressor 21 is condensed through the external heat exchanger 22 and the heating condenser 12 (heat exchanger), and then it is evaporated at the cooling evaporator 11 (heat exchanger). As a result, air introduced into the air-conditioning housing 2 is cooled by the cooling evaporator 11. The cooled air is then heated by the heating condenser 12. In the dehumidifying operation mode, the microcomputer controls the air mixing door 13 so that all the air goes through the heating condenser 12.

Figure 4:
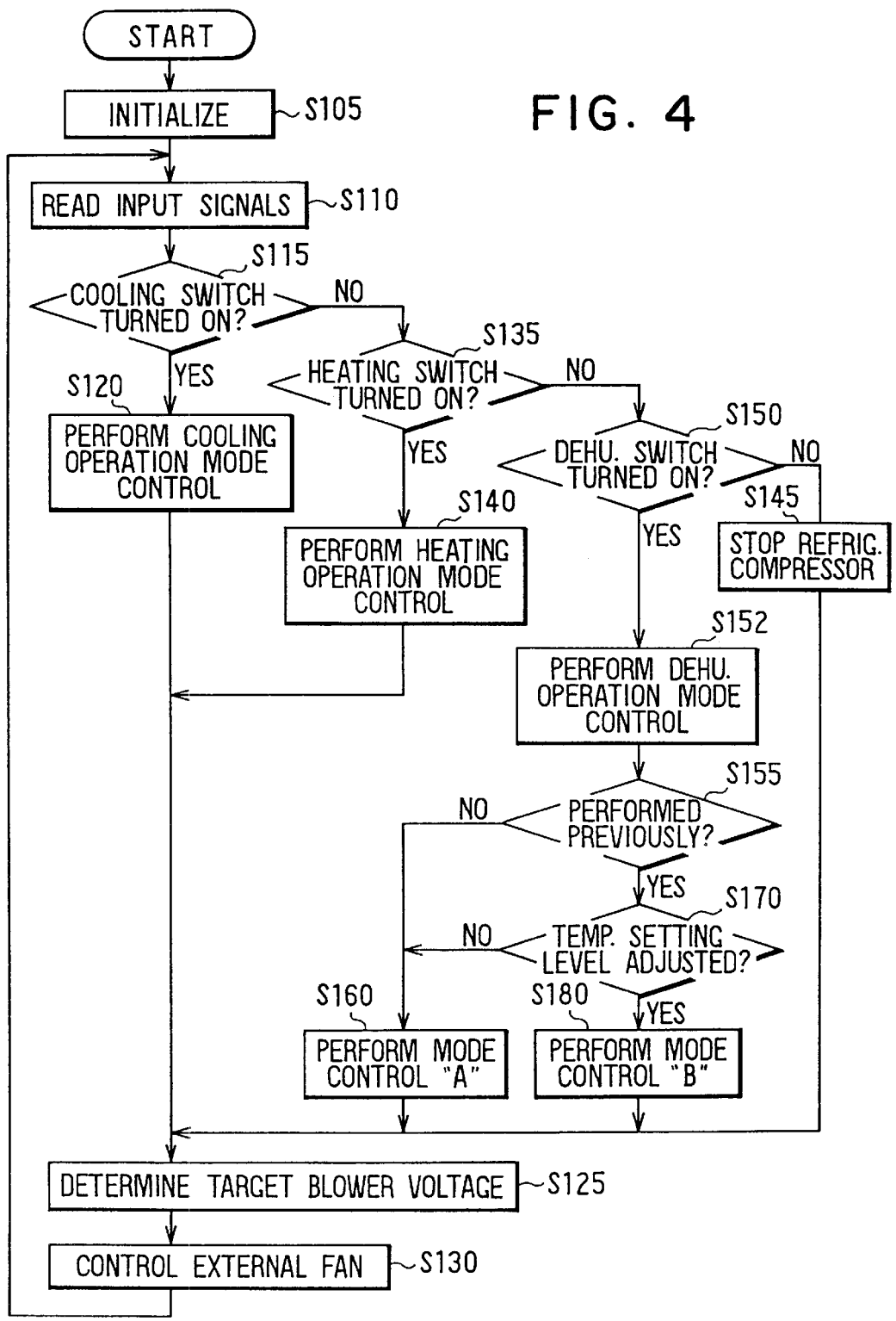
FIG. 4 is a flow diagram showing control steps to be performed by the control unit in the preferred embodiment of the present invention.

Referring to FIG. 4, the following describes a control processing method performed by the microcomputer. First, when the key switch is turned on to connect power to the ECU 40, and the air volume setting lever 53 is set to any position other than the OFF position, the routine shown in FIG. 4 is executed. At step S105, initialization is carried out for the initial setting. Next, at step S110, input signals from the sensors 41 to 44, and input signals from the levers and switches on the control panel 51 are read into the microcomputer. At step S115, the ECU determines whether the cooling switch 55a is turned on. If the cooling switch 55a is turned on, the method advances to step S120 where a cooling operation mode control is performed.

In the cooling operation mode control, a cooling target evaporator blowout temperature, corresponding to a target evaporator outlet temperature, is calculated based on a predefined computational formula (not shown) according to input signals from the sensors 41 to 44 and a set position of the temperature setting lever 56. Then, using the inverter 31, a rotating speed of the refrigerant compressor 21 is controlled so that a temperature of actually conditioned air, detected by the evaporator blowout air temperature sensor 43, meets the cooling target blowout temperature.

Thereafter, at step S125, a target blower voltage is determined according to a set position of the air volume setting lever 53, and the blower motor 10 is controlled to provide the target blower voltage. At step S130, a rotating speed of the external fan 29 (air volume to be blown) is controlled, and then the sequence is returned to step S110.

If the result of the check at step S115 is 'NO', the method advances to step S135 to determine whether the heating switch 55b is turned on. If the determination at step S135 is 'YES', the method advances to step S140 to perform heating operation mode control.

In the heating operation mode control, a heating target blowout temperature corresponding to a target value of condenser outlet temperature is calculated. According to the calculated value of heating target blowout temperature, a target value of heating performance at the heating condenser 12 (more specifically, discharge pressure Pd of the refrigerant compressor 21) is determined. Thus, the inverter 31 is controlled to regulate a rotating speed of the refrigerant compressor 21 so that a value detected by the discharge pressure sensor 41 meets the target value.

If the determination at step S135 is 'NO', the method advances to step S150 to determine whether the dehumidifying switch 55c is turned on. If the result of step S150 is 'NO', it is determined that the cooling operation mode control, heating operation mode control and dehumidifying operation mode control are not selected with the operation mode setting switch 55. Subsequently, the method advances to step S145 to stop the refrigerant compressor 21. Steps S125 and S130 are then carried out to perform air blowing mode operation.

If the dehumidifying switch 55c is turned on and the result of step S150 is 'YES', the method advances to step S152 to perform dehumidifying operation mode control.

The following describes a sequence of the dehumidifying operation mode control to be performed at steps S155 to S180. At step S155, the method determines whether the dehumidifying operation mode control has been performed in the previous execution of the routine flowcharted in FIG. 4. That is, if step S155 is performed in the first execution of the flowcharted routine, the result at step S155 is 'NO', and step S160 is then performed.

Figure 8:
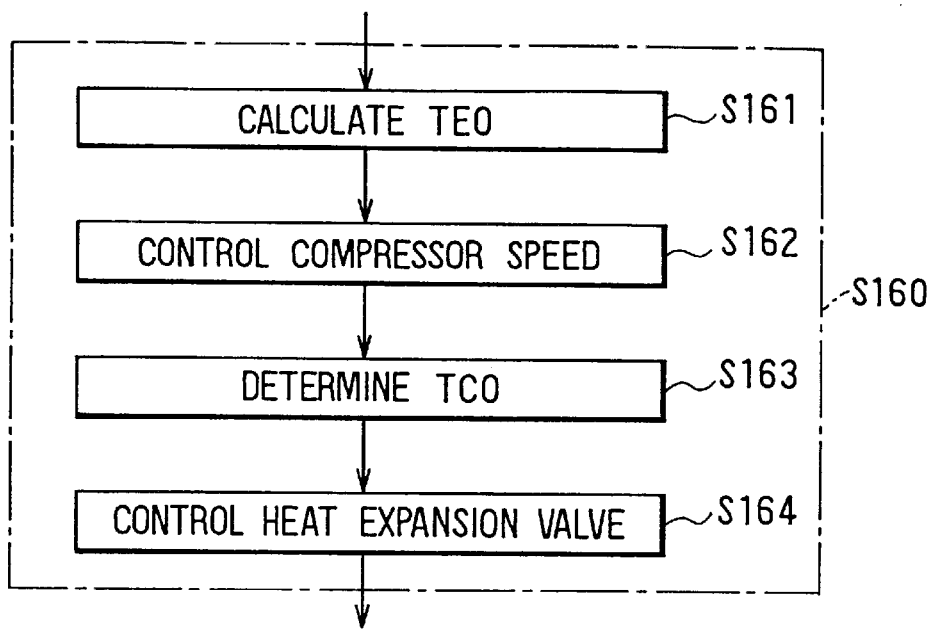
FIG. 8 is a flow diagram showing control steps to be performed for dehumidification-dominant air-conditioning control in the preferred embodiment of the present invention.

At step S160, dehumidifying operation mode control A is performed to carry out dehumidification-dominant air-conditioning control. The following describes a sequence of the dehumidification-dominant air-conditioning control with reference to the flow diagram in FIG. 8.

(1) Dehumidification-Dominant Air-conditioning Control

Figure 5:
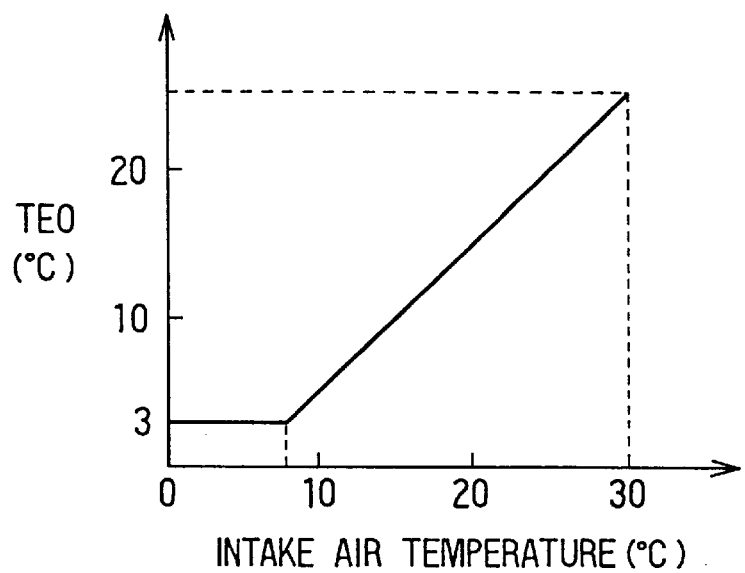
FIG. 5 is a graph showing a relationship between a suction air temperature and a target evaporator outlet temperature in the preferred embodiment of the present invention.

First, at step S161, based on a predetermined characteristic shown in FIG. 5, a target evaporator outlet temperature TEO is calculated so that it becomes 5° C. less than the suction air temperature Tin detected by the suction temperature sensor 42, in a range higher than 3° C. A value of 3° C. corresponds to a predetermined control temperature level to prevent frosting on the cooling evaporator 11.

Next, at step S162, the refrigerant compressor 21 rotational speed is controlled so that a value detected by the evaporator blowout air temperature sensor 43 meets the target evaporator outlet temperature TEO. More specifically, under PI or fuzzy feedback control, the rotating speed of the refrigerant compressor 21 is changed to a larger extent as a difference increases between the value detected by the air temperature sensor 43 (after air passes through the cooling evaporator) and the target evaporator outlet temperature TEO.

The temperature of air introduced into the air-conditioning housing 2 is always lowered by the cooling evaporator 11 to remove moisture from the air, while keeping the evaporator blowout air temperature of the cooling evaporator 11 higher than 3° C. Thus, occurrence of frosting on the cooling evaporator 11 can be prevented.

Figure 6:
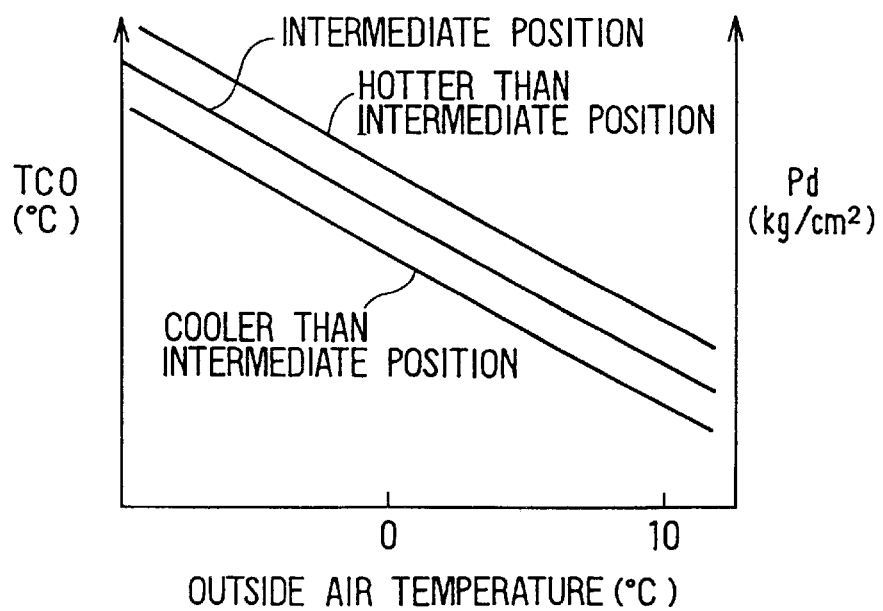
FIG. 6 is a graph showing a relationship among an outside air temperature, a target condenser outlet temperature TCO and a discharge pressure Pd in the preferred embodiment of the present invention.

At step S163, in the dehumidification-dominant air-conditioning control, a target condenser blowout temperature TCO (target condenser outlet temperature) of air that has passed through the heating condenser 12, i.e., a final blowout temperature of conditioned air, is determined according to outside air temperature based on a predetermined characteristic shown in FIG. 6. As shown in FIG. 6, the target condenser outlet temperature TCO increases as function of a set position of the temperature setting lever 56 (HOT).

Also, because the target condenser outlet temperature TCO is correlated with a value of discharge pressure Pd detected by the discharge pressure sensor 41 as shown in FIG. 6, the target condenser outlet temperature TCO is converted into a value represented in discharge pressure Pd. At step S164, based on a predetermined characteristic shown in FIG. 7, a restriction opening of the heating expansion valve 24 is controlled according to a rotating speed of the refrigerant compressor 21.

Figure 7:
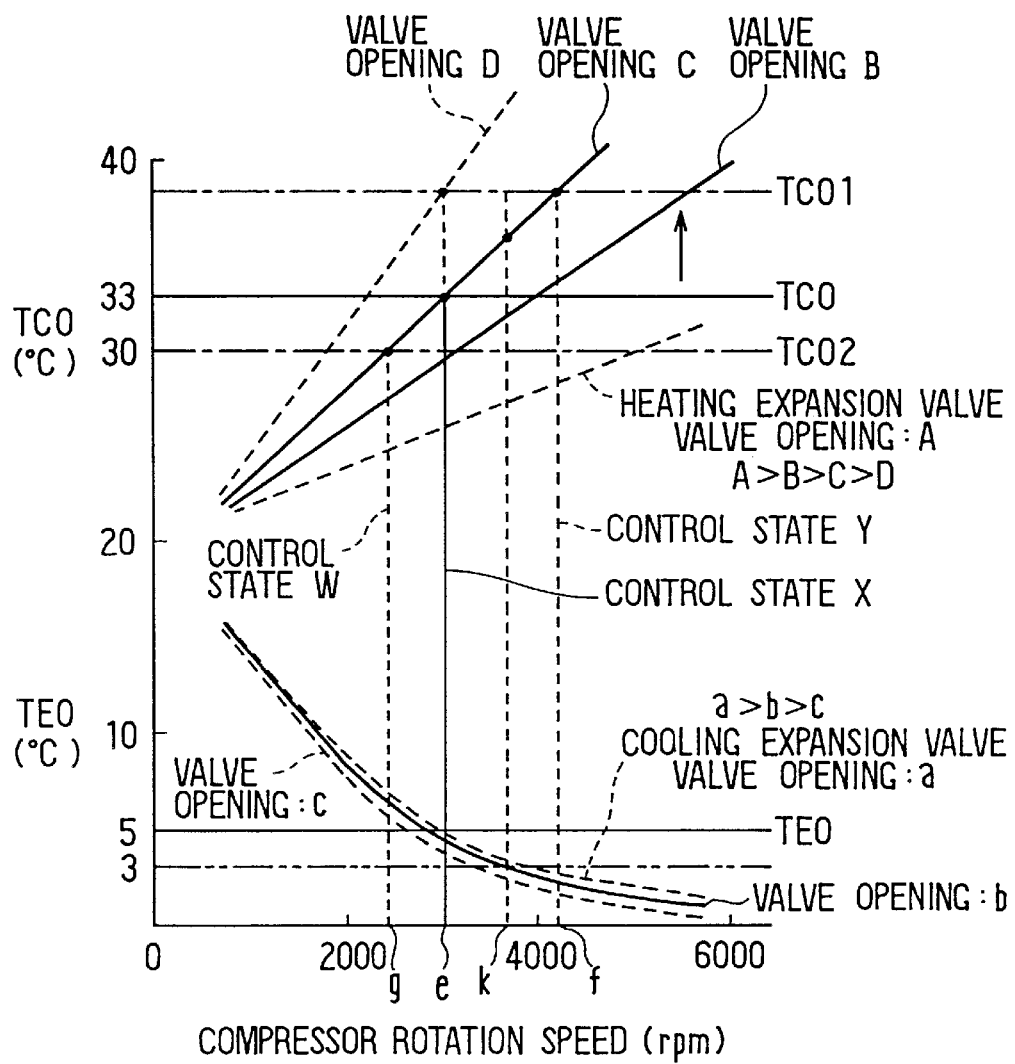
FIG. 7 is a graph showing a correlation among respective control factors for air-conditioning in the preferred embodiment of the present invention.

FIG. 7 shows a correlation diagram of rotating speed of the refrigerant compressor 21, restriction opening of the cooling expansion valve 23, restriction opening of the heating expansion valve 24, evaporator blowout air temperature, target evaporator outlet temperature TEO, condenser blowout air temperature, and target condenser outlet temperature TCO under the conditions that the outside air temperature and the air volume of the fan 9 are constant and that the temperature setting lever 56 is set at the middle position. Although not shown in FIG. 7, the characteristics of these factors vary depending on variables such as the air volume of the fan 9, and the position of the temperature setting lever 56.

Referring again to FIG. 4, at step S155, if it is determined that the dehumidifying operation mode control has been performed in the previous execution of the routine, the method advances to step S170 to determine whether the temperature setting lever 56 has been adjusted. That is, it is determined whether the user has adjusted the temperature setting lever 56 in the dehumidifying operation mode. If the result of step S170 is 'YES', the dehumidification-dominant air-conditioning control is stopped and the method advances to step S180 to perform dehumidifying operation mode control B, i.e., blowout-temperature-dominant air-conditioning control.

Figure 9:
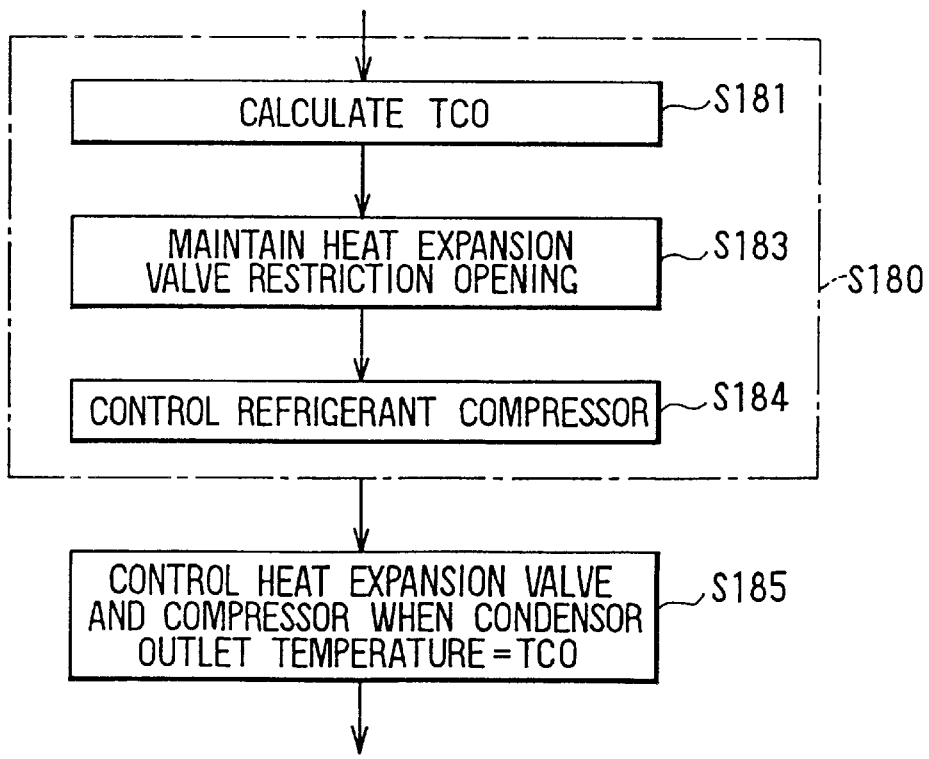
FIG. 9 is a flow diagram showing control steps to be performed for blowout-temperature-dominant air-conditioning control in the preferred embodiment of the present invention.

The following describes a sequence of the blowout-temperature-dominant air-conditioning control with reference to the flow diagram in FIG. 9.

(2) Blowout-Temperature-Dominant Air-Conditioning Control

In the blowout-temperature-dominant air-conditioning control, based on the predetermined characteristic shown in FIG. 6, a target condenser outlet temperature TCO is calculated at step S181 according to a set position of the temperature setting lever 56. Then, at step S183, a restriction opening of the heating expansion valve 24 is maintained. At step S184, based on the predetermined characteristic shown in FIG. 7, a rotating speed of the refrigerant compressor 21 is controlled so that a value of condenser outlet temperature meets the target condenser outlet temperature TCO. More specifically, under PI or fuzzy feedback control, the rotating speed of the refrigerant compressor 21 is changed to a larger extent as a difference increases between a value detected by the condenser blowout air temperature sensor 45 and the target condenser outlet temperature TCO. The restriction opening of the heat expansion valve is controlled at step S185 only after the condenser outlet temperature meets the TCO.

With reference to FIG. 7, the following describes the blowout-temperature-dominant air-conditioning control in further detail. As a premise in the following description, it is assumed that the restriction opening of the cooling expansion valve 23 is 'b', the restriction opening of the heating expansion valve 24 is 'C', the target evaporator outlet temperature TEO is 5° C., the target condenser outlet temperature TCO is 33° C., and the rotating speed of the refrigerant compressor 21 is 'e' in the dehumidification-dominant air-conditioning control. This control state is referred to as 'X' as shown in FIG. 7.

In the above control state X, if a set temperature level is adjusted with the temperature setting lever 56 to increase a blowout temperature of conditioned air by increasing the target condenser outlet temperature TCO to TCO1 (38° C.), the rotating speed of the refrigerant compressor 21 is significantly increased from 'e' to 'f', while the restriction opening of the heating expansion valve 24 is maintained at 'C'. Thus, the condenser outlet temperature is regulated to the temperature TCO1 in the present preferred embodiment (control state Y).

As contrasted, in the control state X, if the set temperature level is adjusted with the temperature setting lever 56 to decrease the blowout temperature of conditioned air by decreasing the target condenser outlet temperature TCO to TCO2 (30° C.), the rotating speed of the refrigerant compressor 21 is decreased from 'e' to 'g', while the restriction opening of the heating expansion valve 24 is maintained at 'C'. Thus, the blowout temperature of conditioned air is regulated to the temperature TCO2 in the present preferred embodiment (control state W).

In the arrangement mentioned above, the rotating speed of the refrigerant compressor 21 is easier to finely control than the heating expansion valve 24. Therefore, it is possible to enhance responsivity of the blowout temperature of conditioned air while preventing occurrence of an overshoot or undershoot condition of the blowout temperature by controlling the rotating speed of the refrigerant compressor 21 for blowout temperature regulation in air-conditioning.

When the control state X is changed to the control state Y as described above, the evaporator blowout air temperature of the cooling evaporator 11 may become lower than 3° C. as shown in FIG. 7, causing frosting on the cooling evaporator 11 (cooling heat exchanger). Also, when the control state X is changed to the control state W, cooling dehumidification performance of the cooling evaporator 11 may decrease since the evaporator blowout temperature increases to a large extent as shown in FIG. 7. Therefore, in the abovementioned blowout-temperature-dominant air-conditioning control of the dehumidifying operation mode, priority is given to blowout temperature controllability. Minimum priority is given to the cooling dehumidification performance of the cooling heat exchanger 11.

Therefore, to ensure the cooling dehumidification performance and to prevent frosting, when the temperature setting lever is adjusted in the dehumidifying operation mode, and the condenser outlet temperature reaches the target condenser outlet temperature TCO, the method advances to step S185 shown in FIG. 9. As described above, in the temperature-dominant air-conditioning control, when the temperature setting lever 56 is adjusted, the condenser outlet temperature is regulated by controlling the rotating speed of the refrigerant compressor 21 while maintaining the restriction opening of the heating expansion valve 24. In contrast, at step S185, both the restriction opening of the heating expansion valve 24 and the rotating speed of the refrigerant compressor 21 are controlled.

More specifically, to prevent possible occurrence of frosting on the cooling evaporator 11 in transition from the control state X to the control state Y, the rotating speed of the refrigerant compressor 21 is decreased from 'f' to 'e'. Also, the restriction opening of the heating expansion valve 24 is reduced from 'c' to 'D'. Thus, the evaporator blowout air temperature of the cooling evaporator 11 does not fall below 3° C., thereby making it possible to prevent frosting on the cooling heat exchanger 11 while maintaining the condenser outlet temperature at the target condenser outlet temperature TCO.

To prevent the possible inadequate cooling dehumidification of the cooling heat exchanger 11 during transition from the control state X to the control state W, the rotating speed of the refrigerant compressor 21 is increased from 'g' to 'e'. Also, the restriction opening of the heating expansion valve 24 is increased from 'C' to 'B'. Thus, the evaporator blowout air temperature of the cooling heat exchanger 11 is decreased, thereby enabling the cooling evaporator 11 to cool and dehumidify air adequately.

In other words, when the temperature setting lever is adjusted in the dehumidifying operation mode and the condenser outlet temperature reaches the target condenser outlet temperature TCO, the dehumidification-dominant air-conditioning control is carried out.

(Other Preferred Embodiments)

Although the evaporator outlet temperature is reduced to a frosting level of the cooling evaporator 11 when the target condenser outlet temperature TCO increases to TCO1, as in transition from the control state X to the control state Y in the abovementioned preferred embodiment, there may be provided such an arrangement that the evaporator outlet temperature is always kept higher than 3° C. For instance, while maintaining the restriction opening of the heating expansion valve 24 at 'B', the rotating speed of the refrigerant compressor 21 is increased from 'e' to 'k'. Thereafter, the restriction opening of the heating expansion valve 24 is gradually changed from 'B' to 'D'. In this manner, the evaporator outlet temperature becomes 3° C. to prevent frosting on the cooling heat exchanger 11, thereby making it possible to enhance initial responsivity of the blowout temperature of conditioned air when the condenser outlet temperature is regulated.

Furthermore, although the target evaporator outlet temperature TEO is 5° C. less than the suction air temperature at or above 3° C. in the dehumidification-dominant air-conditioning control in the abovementioned preferred embodiment, there may be provided such an arrangement that the target evaporator outlet temperature is changed according to outside air temperature and humidity in t he passenger compartment.

Further, although the refrigerant is condensed by the external heat exchanger 22 in the dehumidifying operation mode in the abovementioned preferred embodiment, the external heat exchanger 22 may be used as an evaporator for increasing the blowout temperature of conditioned air when outside air temperature is considerably low. In such a case, a required level of blowout temperature can be provided, for example, by regulating the restriction opening of the cooling expansion valve 23 ('a' to 'c') as shown in FIG. 7.

Having described the present invention as related to the air conditioner for automobiles in the preferred embodiment, it is to be understood that the invention is applicable as an improved air-conditioning arrangement for home and industrial use as well as for any engine-driven vehicles.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An air conditioner, comprising:
   a refrigerating cycle system including a refrigerant compressor, a cooling evaporator equipped in an air-conditioning housing, a heating condenser equipped at an air downstream position of said cooling evaporator in said air-conditioning housing, an external heat exchanger disposed outside said air-conditioning housing, and variable flow restriction means equipped on a refrigerant flow path between said external heat exchanger and said heating condenser,
   said refrigerating cycle system being arranged to enable a dehumidifying operation mode in which a refrigerant discharged from said refrigerant compressor passes through said external heat exchanger after passing through, and being condensed by, said heating condenser, the refrigerant then being evaporated by said cooling evaporator to cool air introduced into said air-conditioning housing, the cooled air then being heated by said heating condenser;
   dehumidification-dominant air-conditioning control means for regulating a cooling dehumidification level required for said cooling evaporator by controlling a rotating speed of said refrigerant compressor according to air-conditioning environmental factors, and for regulating a blowout temperature level of conditioned air from said heating condenser by adjustment of heating performance of said heating condenser through control of a restriction opening of said variable flow restriction means, according to said air-conditioning environmental factors, when said dehumidifying operation mode is selected;

signal generating means for generating a signal for allowing a user to adjust a set temperature level of said blowout temperature;

blowout-temperature-dominant air-conditioning control means for regulating said blowout temperature by controlling the rotating speed of said refrigerant compressor when a signal for adjusting said set temperature level is generated by said signal generating means in said dehumidifying operation mode; and wherein the blowout-temperature-dominant air conditioning control means further maintains the restriction opening of said variable flow restriction means when the signal for adjusting said set temperature level is generated by said signal generating means in said dehumidifying operation mode.

2. An air conditioner, comprising:

a refrigerating cycle system including a refrigerant compressor, a cooling evaporator equipped in an air-conditioning housing, a heating condenser equipped at an air downstream position of said cooling evaporator in said air-conditioning housing, an external heat exchanger disposed outside said air-conditioning housing, and variable flow restriction means equipped on a refrigerant flow path between said external heat exchanger and said heating condenser, said refrigerating cycle system being arranged to enable a dehumidifying operation mode in which a refrigerant discharged from said refrigerant compressor passes through said external heat exchanger after passing through, and being condensed by, said heating condenser, the refrigerant then being evaporated by said cooling evaporator to cool air introduced into said air-conditioning housing, the cooled air then being heated by said heating condenser;

dehumidification-dominant air-conditioning control means for regulating a cooling dehumidification level required for said cooling evaporator by controlling a rotating speed of said refrigerant compressor according to air-conditioning environmental factors, and for regulating a blowout temperature level of conditioned air from said heating condenser by adjustment of heating performance of said heating condenser through control of a restriction opening of said variable flow restriction means, according to said air-conditioning environmental factors, when said dehumidifying operation mode is selected;

signal generating means for generating a signal for allowing a user to adjust a set temperature level of said blowout temperature;

blowout-temperature-dominant air-conditioning control means for regulating said blowout temperature by controlling the rotating speed of said refrigerant compressor when a signal for adjusting said set temperature level is generated by said signal generating means in said dehumidifying operation mode;

suction air temperature sensor means for detecting a suction air temperature of said cooling evaporator;

evaporator blowout air temperature sensor means for detecting an evaporator blowout air temperature after air passes through said cooling evaporator;

condenser blowout air temperature sensor means for detecting a condenser blowout air temperature after air passes through said heating condenser; and condenser blowout air temperature calculating means for calculating a target condenser blowout air temperature for said condenser blowout air temperature according to at least said air-conditioning environmental factors;

wherein said dehumidification-dominant air-conditioning control means, when said set temperature is maintained by said signal generating means in said dehumidifying operation mode, controls the rotating speed of said refrigerant compressor so that said dehumidification level required for said cooling evaporator is satisfied according to said suction air temperature and said evaporator blowout air temperature, said evaporator blowout air temperature to prevent occurrence of frosting on said cooling evaporator, while controlling said restriction opening to regulate said blowout temperature to said target condenser blowout air temperature, and said blowout-temperature-dominant air-conditioning control means, when said signal generating means generates a signal for changing said set temperature, stops a control state provided by said dehumidification-dominant air-conditioning control means and controls the rotating speed of said refrigerant compressor forcedly while maintaining said restriction opening to regulate said blowout temperature to said target condenser blowout air temperature.

3. An air conditioner according to claim 2, further comprising:

target evaporator blowout air temperature calculating means for calculating a target evaporator blowout air temperature of said evaporator blowout air temperature so that said required dehumidification level is satisfied according to said suction air temperature and said evaporator blowout air temperature and that said evaporator blowout air temperature becomes higher than said predetermined control temperature;

wherein said dehumidification-dominant air-conditioning control means controls the rotating speed of said refrigerant compressor to regulate said evaporator blowout air temperature to said target evaporator blowout air temperature, and said blowout-temperature-dominant air-conditioning control means stops a control state provided by said dehumidification-dominant air-conditioning control means and controls the rotating speed of said refrigerant compressor.

4. An air conditioner according to claim 2, wherein when said blowout temperature reaches said target condenser blowout air temperature, a control state provided by said dehumidification-dominant air-conditioning control means is restored, the rotating speed of said refrigerant compressor is controlled to regulate said evaporator blowout temperature to said target evaporator blowout air temperature, and said restriction opening is controlled to regulate said blowout temperature to said target condenser blowout air temperature.

5. An air conditioner according to claim 4, wherein the rotating speed of said refrigerant compressor and said restriction opening are decreased when said signal generating means generates a signal for increasing said blowout temperature, and the rotating speed of said refrigerant compressor and said restriction opening are increased when said signal generating means generates a signal for decreasing said blowout temperature.

6. A motor vehicle air conditioner system, comprising:

an air conditioner housing including an air inlet that receives air to be conditioned. and an air outlet for outputting conditioned air to a user environment;

an air conditioner that defines a refrigerant flow circuit through a plurality of air conditioner components, including an evaporator operatively located within the housing that cools air entering the housing through the air inlet, a compressor connected to the evaporator to compress evaporated refrigerant flowing from the evaporator, a condenser connected to the evaporator, and located within the housing, that selectively condenses refrigerant flowing from the compressor and heats air cooled by the evaporator, a heat exchanger connected to the evaporator, the compressor and the condenser and located outside of the housing, and valving located between the plurality of air conditioner components that selectively restricts refrigerant flow;

a control panel that permits a user to select an air conditioner operating mode, including a dehumidifying mode;

a plurality of air conditioner sensors that sense air conditioner operating conditions and that generate signals indicative of the sensed operating conditions;

a controller that receives the signals from the plurality of sensors, and that adjusts operating parameters of the compressor and the valving to adjust output air temperature during a dehumidification mode having dehumidification as a dominant factor; and the controller adjusting the operating parameters of the compressor during a dehumidification mode having the output air temperature as a dominant factor, to minimize sensed output temperature overshoot and undershoot, and to minimize time needed to reach the target output air temperature;

wherein the controller further maintains the operating parameters of the valving during the dehumidification mode having the output air temperature as a dominant factor.

7. A motor vehicle air conditioner system, comprising:

an air conditioner housing including an air inlet that receives air to be conditioned, and an air outlet for outputting conditioned air to a user environment;

an air conditioner that defines a refrigerant flow circuit through a plurality of air conditioner components, including an evaporator operatively located within the housing that cools air entering the housing through the air inlet, a compressor connected to the evaporator to compress evaporated refrigerant flowing from the evaporator, a condenser connected to the evaporator, and located within the housing, that selectively condenses refrigerant flowing from the compressor and heats air cooled by the evaporator, a heat exchanger connected to the evaporator, the compressor and the condenser and located outside of the housing, and valving located between the plurality of air conditioner components that selectively restricts refrigerant flow;

a control panel that permits a user to select an air conditioner operating mode, including a dehumidifying mode;

a plurality of air conditioner sensors that sense air conditioner operating conditions and that generate signals indicative of the sensed operating conditions;

a controller that receives the signals from the plurality of sensors, and that adjusts operating parameters of the compressor and the valving to adjust output air temperature during a dehumidification mode having dehumidification as a dominant factor; and the controller adjusting the operating parameters of the compressor during a dehumidification mode having the output air temperature as a dominant factor, to minimize sensed output temperature overshoot and undershoot, and to minimize time needed to reach the target output air temperature;

wherein the controller maintains a temperature different between air entering the evaporator and air exiting the evaporator between a predetermined temperature range and above a predetermined minimum evaporator frosting temperature during the dehumidification mode having dehumidification as a dominant factor.

8. The system of claim 7, wherein the controller maintains a temperature difference between air entering the evaporator and air exiting the evaporator between a predetermined temperature range and above a predetermined minimum evaporator frosting temperature by controlling operating parameters of the compressor and the valving.

9. A motor vehicle air conditioner system, comprising:

an air conditioner housing including an air inlet that receives air to be conditioned, and an air outlet for outputting conditioned air to a user environment;

an air conditioner that defines a refrigerant flow circuit through a plurality of air conditioner components, including an evaporator operatively located within the housing that cools air entering the housing through the air inlet, a compressor connected to the evaporator to compress evaporated refrigerant flowing from the evaporator, a condenser connected to the evaporator, and located within the housing, that selectively condenses refrigerant flowing from the compressor and heats air cooled by the evaporator, a heat exchanger connected to the evaporator, the compressor and the condenser and located outside of the housing, and valving located between the plurality of air conditioner components that selectively restricts refrigerant flow;

a control panel that permits a user to select an air conditioner operating mode, including a dehumidifying mode;

a plurality of air conditioner sensors that sense air conditioner operating conditions and that generate signals indicative of the sensed operating conditions;

a controller that receives the signals from the plurality of sensors, and that adjusts operating parameters of the compressor and the valving to adjust output air temperature during a dehumidification mode having dehumidification as a dominant factor; and the controller adjusting the operating parameters of the compressor during a dehumidification mode having the output air temperature as a dominant factor, to minimize sensed output temperature overshoot and undershoot, and to minimize time needed to reach the target output air temperature;

wherein the controller maintains a temperature difference between air entering the evaporator and air exiting the evaporator between a predetermined temperature range and above a predetermined minimum evaporator frosting temperature by controlling operating parameters of the compressor and the valving during the dehumidification mode having conditioned air temperature as a dominant factor, after a target condenser outlet temperature is reached.

10. A motor vehicle air conditioner system, comprising:

a heat pump that conditions air according to selected user air conditioning parameters, and that outputs conditioned air to a user environment in response to a target temperature, the heat pump including both a refrigerant compressor and a flow valve connected with a plurality of heat pump components to define a refrigerant flow path circuit;

a plurality of sensors that sense heat pump operating conditions and that generate signals indicative of the sensed conditions; and a controller that receives the signals from the plurality of sensors, and that adjusts heat pump operating parameters, including operating parameters of the both the compressor and the valve, during a sensed dehumidification dominant dehumidifying mode, and that adjusts heat pump operating parameters, including operating parameters of the compressor, while maintaining operating parameters of the valve, during a sensed temperature dominant dehumidifying mode to minimize overshoot and undershoot of a sensed output air target temperature and to minimize time needed to reach the output air target temperature.

11. A method of controlling a dehumidification mode of an air conditioner system, comprising the steps of:

sensing system-generated mode control signals to determine an operating mode;

adjusting system operating parameters, including operating parameters of a system compressor and a system valve, during a sensed dehumidification dominant dehumidifying operating mode;

adjusting system operating parameters, including operating parameters of the system compressor during a sensed temperature dominant dehumidifying mode to minimize overshoot and undershoot of a sensed output air target temperature and to minimize time needed to reach the output air target temperature; and maintaining operating parameters of the system valve during the sensed temperature dominant dehumidifying mode, to minimize overshoot and undershoot of a sensed output air target temperature and to minimize time need to reach the out put air target temperature.

12. A method of controlling a dehumidification mode of an air conditioner system, comprising the steps of:

sensing system-generated mode control signals to determine an operating mode;

adjusting system operating parameters, including operating parameters of a system compressor and a system valve, during a sensed dehumidification dominant dehumidifying operating mode;

adjusting system operating parameters, including operating parameters of the system compressor during a sensed temperature dominant dehumidifying mode to minimize overshoot and undershoot of a sensed output air target temperature and to minimize time needed to reach the output air target temperature; and adjusting system operating parameters, including operating parameters of the system compressor and the system valve, once the target temperature is reached in a sensed temperature dominant dehumidifying mode, to maintain conditioned air temperature above a frosting level.

* * * * *